United States Patent
Naruke

(10) Patent No.: US 9,321,338 B2
(45) Date of Patent: Apr. 26, 2016

(54) MOUNTING STRUCTURE OF BATTERY PACK

(71) Applicant: Fuji Jukogyo Kabushiki Kaisha, Tokyo (JP)

(72) Inventor: Toshiaki Naruke, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/506,623

(22) Filed: Oct. 4, 2014

(65) Prior Publication Data

US 2015/0107921 A1 Apr. 23, 2015

(30) Foreign Application Priority Data

Oct. 17, 2013 (JP) .................................. 2013-216163

(51) Int. Cl.
*B60R 16/04* (2006.01)
*B60K 1/04* (2006.01)
*B62D 25/20* (2006.01)

(52) U.S. Cl.
CPC . *B60K 1/04* (2013.01); *B62D 25/20* (2013.01); *B60K 2001/0422* (2013.01); *B60K 2001/0438* (2013.01)

(58) Field of Classification Search
CPC ............ B60R 16/04; B60R 2011/0012; B60R 2011/0029; B60K 6/28; B60K 1/04; B62D 25/20
USPC ............ 280/68.5, 311, 312; 296/37.8, 37.14, 296/37.15, 37.16; 180/68.5, 311, 312
See application file for complete search history.

(56) References Cited

U.S. PATENT DOCUMENTS

| 7,048,321 | B2 * | 5/2006 | Bandoh ................. | B60N 2/468 180/68.5 |
| 8,561,743 | B2 * | 10/2013 | Iwasa ....................... | B60K 1/04 180/68.5 |
| 8,939,246 | B2 * | 1/2015 | Yamaguchi ............... | B60K 1/04 180/311 |
| 2009/0134686 | A1 * | 5/2009 | Naito ................... | B60N 2/4221 297/452.55 |
| 2012/0021301 | A1 * | 1/2012 | Ohashi ..................... | B60K 1/04 429/400 |
| 2013/0229030 | A1 | 9/2013 | Yamaguchi et al. | |

FOREIGN PATENT DOCUMENTS

| JP | 7-52835 A | 2/1995 |
| JP | 2006-168600 A | 6/2006 |
| JP | 2012-56395 A | 3/2012 |
| WO | WO 2012/063393 A1 | 5/2012 |

* cited by examiner

*Primary Examiner* — John Walters
(74) *Attorney, Agent, or Firm* — McGinn IP Law Group PLLC

(57) ABSTRACT

A battery pack held under a floor panel by a battery pan attached under the floor panel of a vehicle body is disposed at a position inside a over-floor framework formed over the floor panel by a pair of seat rails, a front upper seat cross member, and a right upper seat cross member.

14 Claims, 8 Drawing Sheets

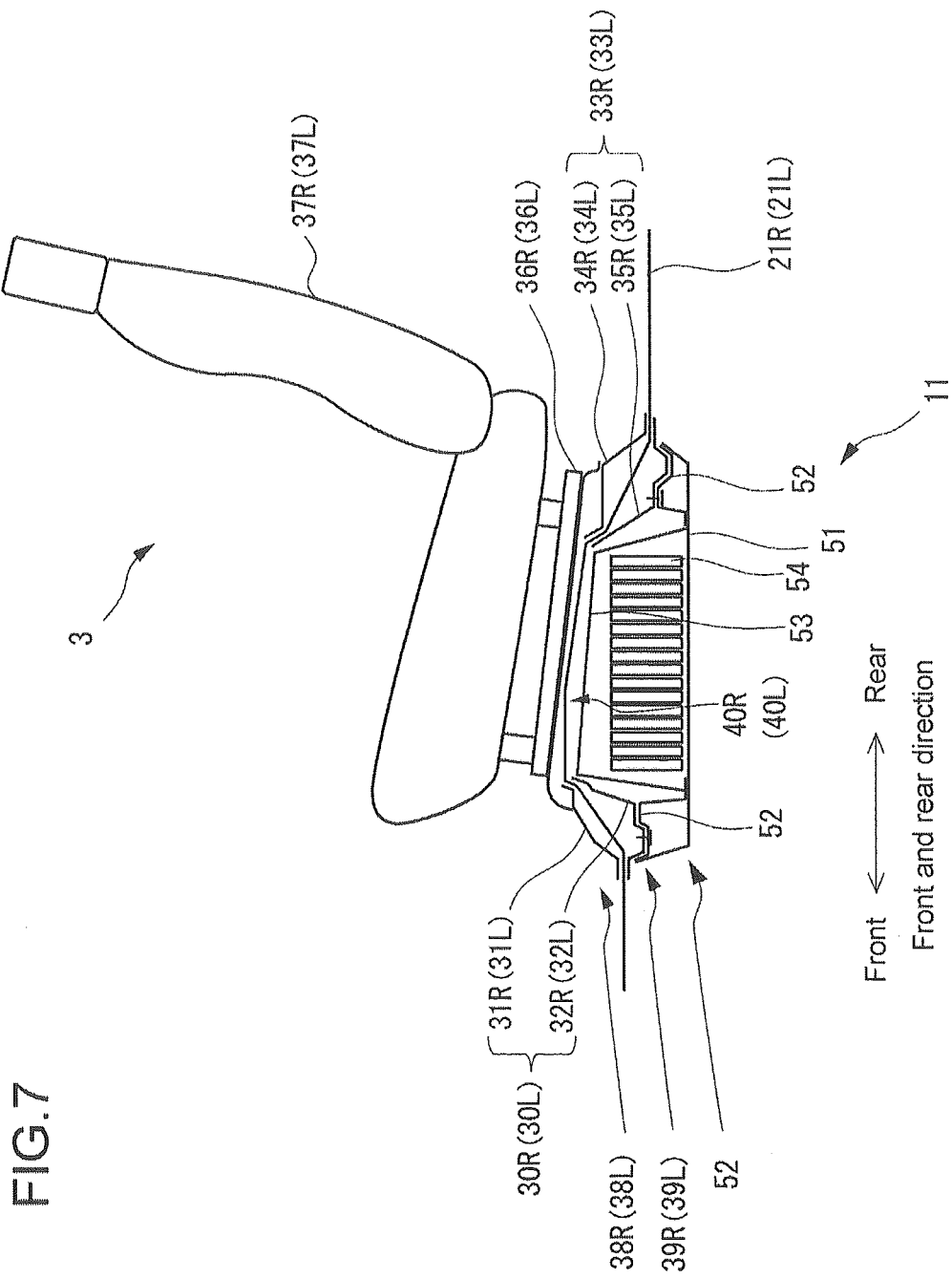

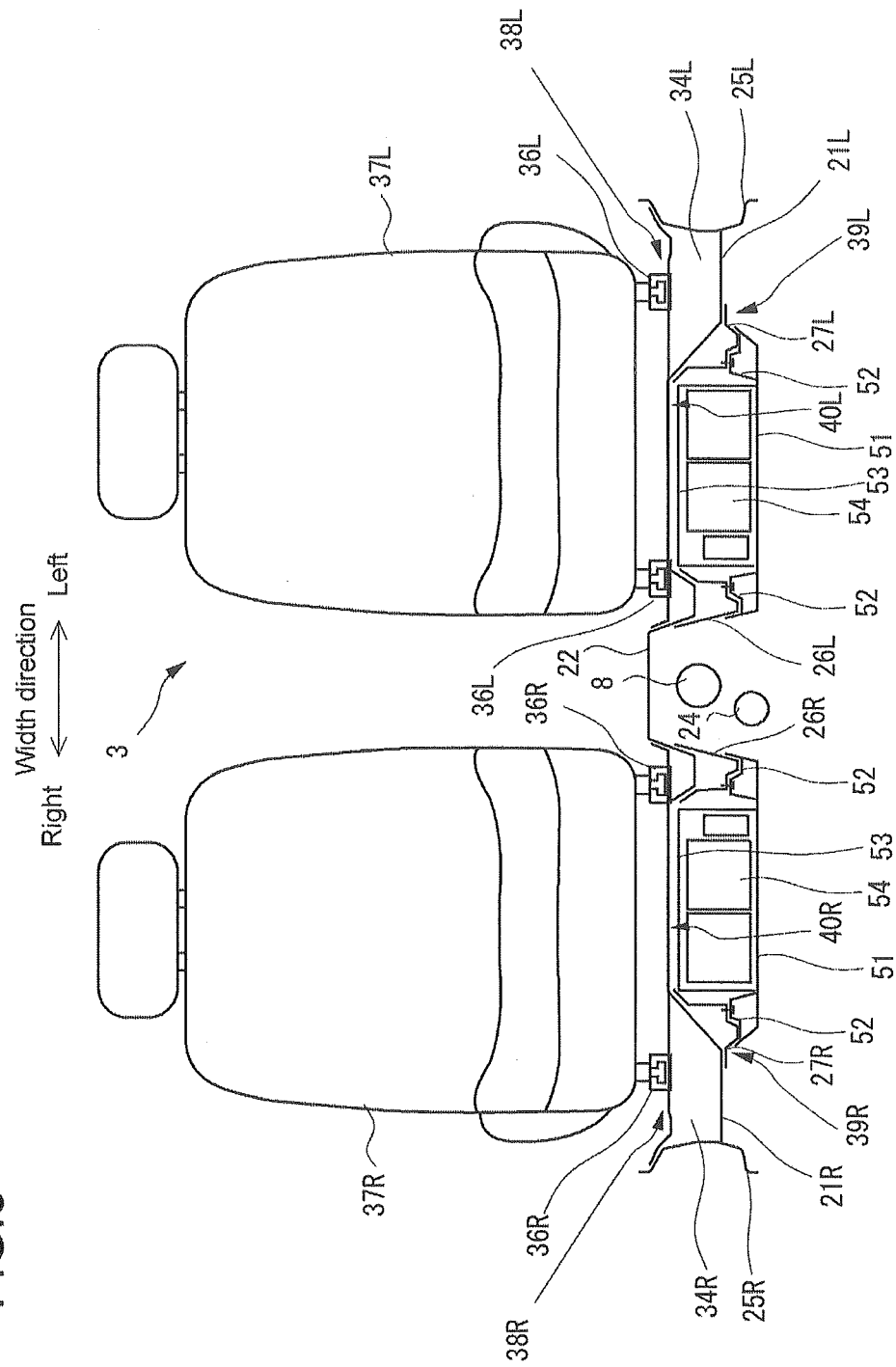

MOUNTING STRUCTURE OF BATTERY PACK

CROSS-REFERENCE TO RELATED APPLICATIONS

The present disclosure claims priority from Japanese Patent Application No. 2013-216163 filed on Oct. 17, 2013, the entire contents of which are hereby incorporated by reference.

BACKGROUND

1. Technical Field

The present disclosure relates to a mounting structure of a battery pack in a vehicle body.

2. Related Art

In recent years, a hybrid car having an engine and a motor as drive sources or an electric car having the motor as the drive source is developed. In these cars, it is desired to mount a large number of battery packs as the drive source in a vehicle body in order to operate the motor with electricity.

Accordingly, in these cars, the battery pack is mounted in, e.g., a trunk.

In contrast, in the case where it is desired not to reduce the capacity of the trunk, as in Japanese Unexamined Patent Application Publication No. 7-052835 (JP-A), Japanese Unexamined Patent Application Publication No. 2012-056395 (JP-A), WO 2012/063393, and Japanese Unexamined Patent Application Publication No. 2006-168600 (JP-A). It is conceived that the battery pack is mounted under a floor panel of the vehicle body.

However, in the case where the battery pack is mounted under the floor panel of the vehicle body as in JP-A No. 7-052835, JP-A No. 2012-056395, WO 2012/063393, and JP-A No. 2006-168600, in reality, it is necessary to newly secure a space for mounting the battery pack under the floor panel of the vehicle body. As a result, it is necessary to heighten the level of a floor surface of a passenger compartment so that the height of the practical space of the vehicle body is reduced.

Thus, even when the battery pack is mounted in the trunk or under the floor panel, the space of the passenger compartment or the trunk is eventually reduced. As a result, the comfort of the passenger compartment or the trunk is impaired.

Thus, in vehicles such as the car and the like, it is required to secure the mounting capacity of the battery pack without impairing the comfort of the passenger compartment or the trunk.

SUMMARY OF THE INVENTION

An aspect of the present disclosure provides a mounting structure of a battery pack of a vehicle body including: a floor panel of the vehicle body, a pair of seat rails that support a seat in which a passenger sits such that the seat is slidable in a front and rear direction of the vehicle body, a front upper seat cross member that is joined to an upper side of the floor panel so as to extend in a width direction of the vehicle body, and fixes the pair of seat rails to the upper side of the floor panel, a rear upper seat cross member that is joined to the upper side of the floor panel at a position at the rear of the front upper seat cross member so as to extend in the width direction of the vehicle body, and fixes the pair of seat rails to the upper side of the floor panel, and a battery pan that is attached under the floor panel, and holds the battery pack of the vehicle body between the floor panel and the battery pan. The battery pack of the vehicle body held under the floor panel is disposed at a position inside an over-floor framework formed over the floor panel by the pair of seat rails, the front upper seat cross member, and the rear upper seat cross member.

The floor panel may have a raised portion that protrudes upward within the over-floor framework, and the battery pack of the vehicle body held under the floor panel is disposed in a concave portion formed by the raised portion in a back surface of the floor panel.

The mounting structure of the battery pack of the vehicle body may further include a front lower seat cross member that is joined to a lower side of the floor panel at a position below the front upper seat cross member so as to extend in the width direction of the vehicle body, and a rear lower seat cross member that is joined to the lower side of the floor panel at a position below the rear upper seat cross member so as to extend in the width direction of the vehicle body, and the battery pan is attached to the front lower seat cross member and the rear lower seat cross member.

The mounting structure of the battery pack of the vehicle body may further include a pair of under-floor frames that are joined to the lower side of the floor panel so as to extend in the front and rear direction of the vehicle body along the pair of seat rails, the pair of under-floor frames form an under-floor framework under the floor panel together with the front lower seat cross member and the rear lower seat cross member, and the battery pan is attached to the under-floor framework.

The battery pan may have a battery framework that is stacked on the under-floor framework over an entire periphery of the battery framework, and a joint surface of each of the under-floor framework and the battery framework has a stepped portion that extends along the entire periphery of each of the under-floor framework and the battery framework.

BRIEF DESCRIPTION OF THE DRAWINGS

FIG. 7 is a schematic explanatory view of a state in which the battery module is attached under a seat when viewed from the right; and FIG. 8 is a schematic explanatory view of the state in which the battery module is attached under the seat when viewed from the front.

DETAILED DESCRIPTION

Hereinafter, an implementation of the present disclosure will be described in detail with reference to the drawings.

Figure 1:
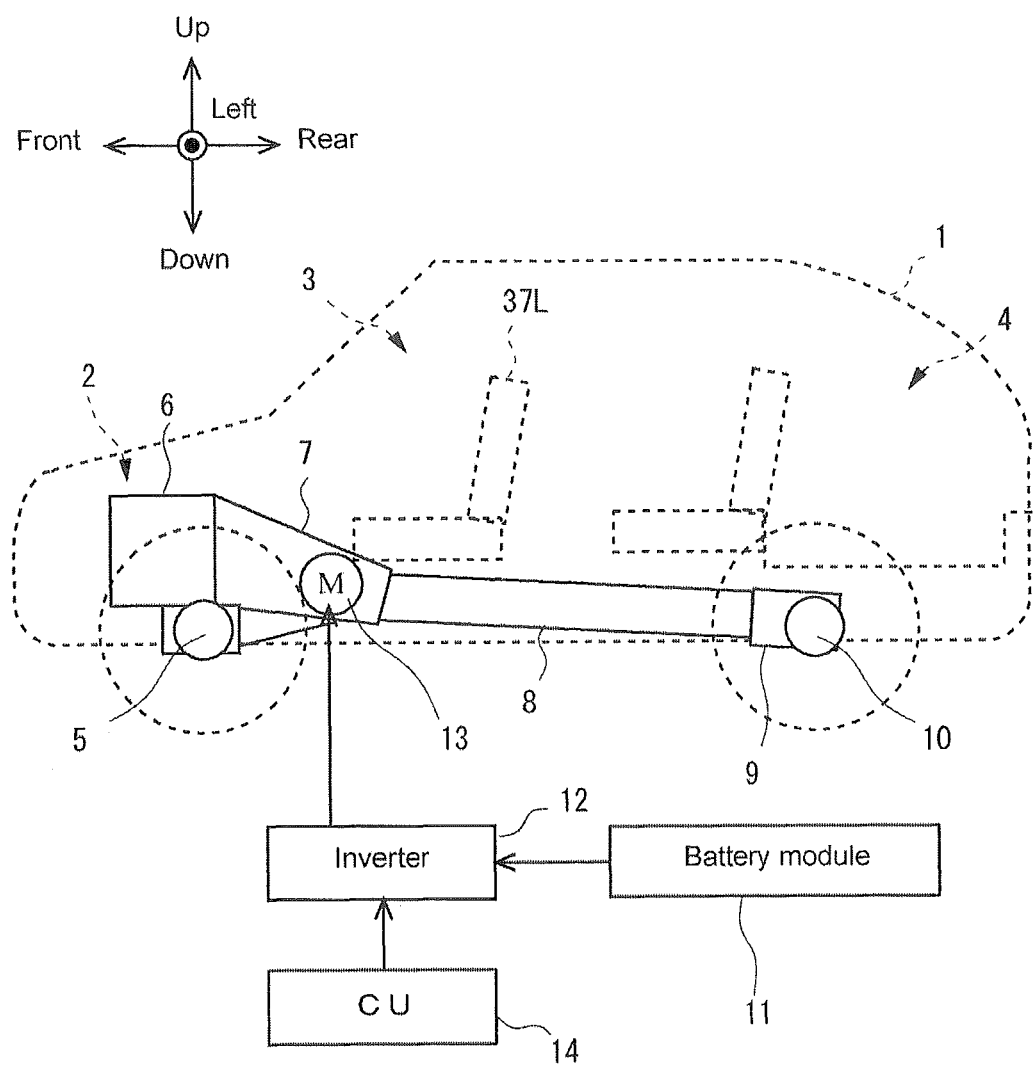
FIG. 1 is an explanatory view illustrating a schematic configuration of a vehicle body and a drive system of a hybrid car according to an implementation of the present invention.

The hybrid car of FIG. 1 has a vehicle body 1. In the vehicle body 1, a front compartment 2, a passenger compartment 3, and a trunk 4 are defined.

In the front compartment 2 of the vehicle body 1, an axle 5 of front wheels, an engine 6, and a transmission 7 including a motor are disposed. A drive shaft 8 that extends in a front and rear direction of the vehicle body 1 is disposed at the center under a floor of the passenger compartment 3. A rear differential box 9 and an axle 10 of rear wheels are disposed under the trunk 4.

A driving force generated by the engine 6 is transmitted to the axle 5 of the front wheels via the transmission 7. The driving force is transmitted from the transmission 7 to the axle 10 of the rear wheels via the drive shaft 8 and the rear differential box 9. The front wheels and the rear wheels are driven with the driving force of the engine 6.

In addition, the hybrid car of FIG. 1 has a battery module 11, an inverter 12, a motor 13 incorporated in the transmission 7, and a control unit (CU) 14.

The battery module 11 has a plurality of the battery packs 54 illustrated in FIG. 4 that will be described later.

The inverter 12 is connected between the battery module 11 and the motor 13. The inverter 12 converts the stored power voltage of the battery pack 54, and outputs the stored power to the motor 13. The front wheels and the rear wheels are driven with the driving force of the motor 13.

The motor 13 is incorporated in the transmission 7, and rotationally drives the drive shaft 8 and the like. Note that the motor 13 may be provided separately from the transmission 7 or may also be provided integrally with the engine 6 without being incorporated in the transmission 7.

The CU 14 is connected to the inverter 12. The CU 14 controls output power from the inverter 12 to the motor 13. The CU 14 is also connected to the engine 6 and the transmission 7. The CU 14 controls the output of the engine 6 and the output of the motor 13 in the hybrid car.

Incidentally, in the hybrid car having the engine 6 and the motor 13 as drive sources, it is desired to mount a large number of the battery packs 54 in the vehicle body 1 as the power source. In an electric car having only the motor 13 as the drive source as well, it is also desired to mount a large number of the battery packs 54.

Accordingly, in these cars, in order to mount a large number of the battery packs 54, electric drive members such as the battery module 11 and the inverter 12 are mounted in the trunk 4. However, in the case where the battery module 11 and the like are mounted in the trunk 4, the capacity of the trunk 4 that can be used by a passenger is reduced.

Thus, in vehicles such as the hybrid car and the electric car, it is required to improve a mounting structure of the battery pack 54 in the vehicle body 1.

Figure 2:
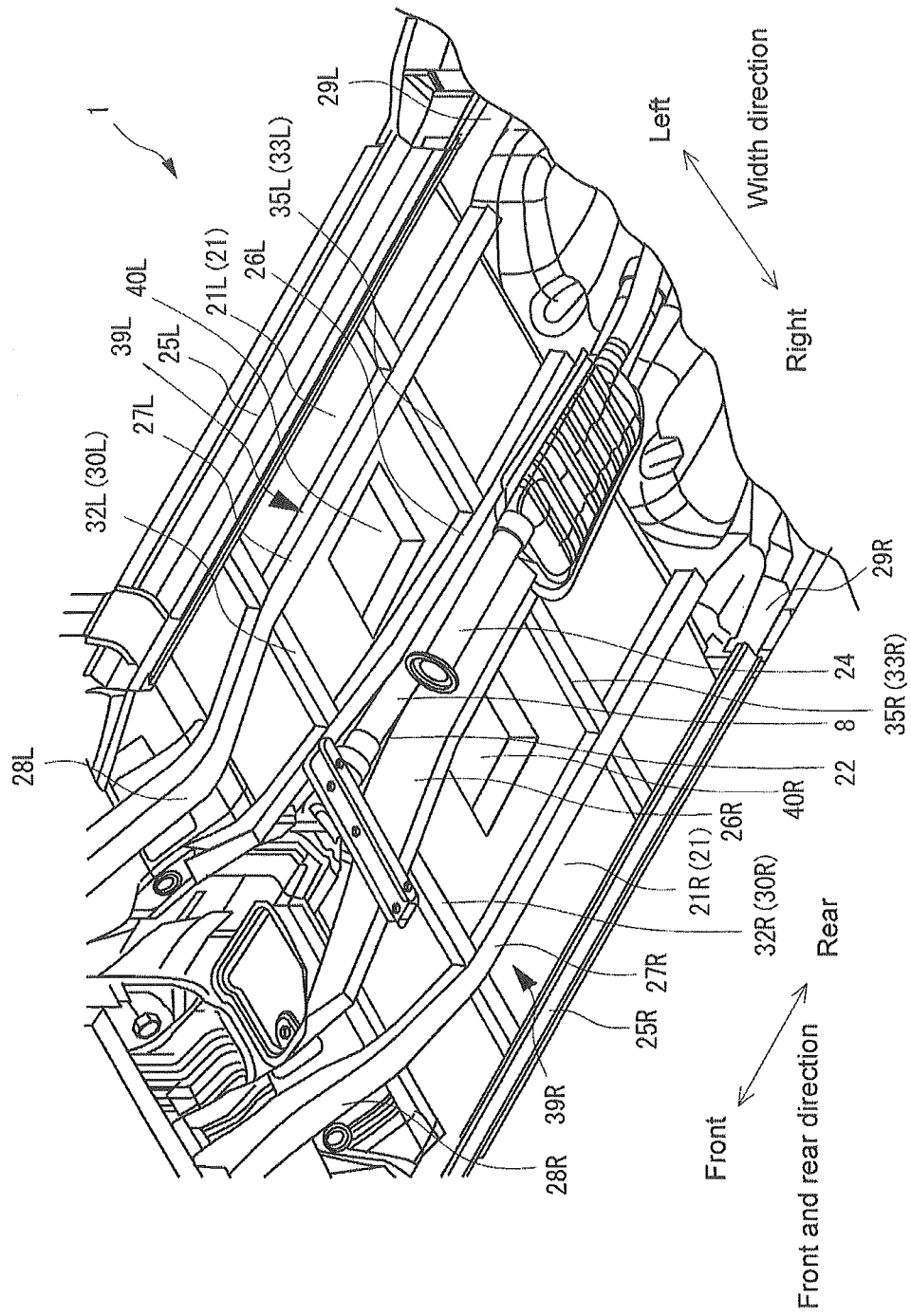
FIG. 2 is a partial perspective view of the vehicle body of the hybrid car of FIG. 1 when viewed obliquely from below.

FIG. 2 is a partial perspective view of the vehicle body 1 of the hybrid car of FIG. 1 when viewed obliquely from below.

FIG. 2 illustrates a floor panel 21 of the passenger compartment 3 of the vehicle body 1. The floor panel 21 is separated into a right floor panel 21R and a left floor panel 21L by a center tunnel panel 22. The right floor panel 21R and the left floor panel 21L are joined to the right and left sides of the center tunnel panel 22. The center tunnel panel 22 is curved so as to have an inverted U-shaped cross section, and the drive shaft 8 and an exhaust pipe 24 of the engine 6 are disposed inside the center tunnel panel 22.

A right side sill 25R extending in the front and rear direction of the vehicle body 1 is joined to a right outer edge of the right floor panel 21R in a width direction of the vehicle body 1. A left inner edge of the right floor panel 21R in the width direction of the vehicle body 1 is joined to the center tunnel panel 22. To the lower side of the joint portion between the right floor panel 21R and the center tunnel panel 22, a right tunnel frame 26R extending in the front and rear direction of the vehicle body 1 under the right floor panel 21R is joined. To the lower surface of the floor panel 21R, a right floor frame 27R extending in the front and rear direction of the vehicle body 1 is joined. The right floor frame 27R is positioned between the right side sill 25R and the right tunnel frame 26R. A right center beam 28R is joined to the front end of the right floor frame 27R. A right rear beam 29R is joined to the rear end of the right side sill 25R.

In addition, to the right floor panel 21R, a right front seat cross member 30R extending in the width direction of the vehicle body 1 is joined. The right front seat cross member 30R extends from the right side sill 25R to the center tunnel panel 22. The right front seat cross member 30R has a right front upper seat cross member 31R (see FIG. 7) joined to the upper side of the right floor panel 21R and a right front lower seat cross member 32R joined to the lower side of the right floor panel 21R. The right front upper seat cross member 31R and the right front lower seat cross member 32R are joined to positions over and under the right floor panel 21R that overlap each other.

Further, to the right floor panel 21R, a right rear seat cross member 33R extending in the width direction of the vehicle body 1 is joined. The right rear seat cross member 33R is disposed at the rear of the right front seat cross member 30R. The right rear seat cross member 33R extends from the right side sill 25R to the center tunnel panel 22. The right rear seat cross member 33R has a right rear upper seat cross member 34R (see FIG. 7) joined to the upper side of the right floor panel 21R and a right rear lower seat cross member 35R joined to the lower side of the right floor panel 21R. The right rear upper seat cross member 34R and the right rear lower seat cross member 35R are joined to positions over and under the right floor panel 21R that overlap each other.

To the right front upper seat cross member 31R and the right rear upper seat cross member 34R that are disposed so as to be arranged in the front and rear direction on the right floor panel 21R, a pair of right seat rails 36R extending in the front and rear direction are fixed, as illustrated in FIGS. 7 and 8 described later. The pair of right seat rails 36R are disposed so as to be arranged in the width direction of the vehicle body 1, and support a right seat 37R in which a passenger sits such that the right seat 37R is slidable in the front and rear direction of the vehicle body 1.

Thus, over the right floor panel 21R, a right over-floor framework 38R is formed by the right front upper seat cross member 31R, the right rear upper seat cross member 34R, and the pair of right seat rails 36R. The right over-floor framework 38R is formed under the right seat 37R in which the passenger sits.

In addition, as illustrated in FIG. 2, under the right floor panel 21R, a right under-floor framework 39R is formed by the right front lower seat cross member 32R, the right rear lower seat cross member 35R, the right floor frame 27R, and the right tunnel frame 26R.

As illustrated in FIG. 7, the right under-floor framework 39R is positioned below the right over-floor framework 38R. The right under-floor framework 39R and the right over-floor framework 38R firmly stiffen the right floor panel 21R from above and below.

Further, the right floor panel 21R has a right raised portion 40R that protrudes upward inside the right over-floor framework 38R and the right under-floor framework 39R that are provided at positions that overlap each other. The right raised portion 40R is positioned close to the back of the right seat 37R.

With the right raised portion 40R, a portion that is concave when viewed from the back surface of the floor is formed in the back surface of the right floor panel 21R.

A left side sill 25L extending in the front and rear direction of the vehicle body 1 is joined to a left outer edge of the left floor panel 21L in the width direction of the vehicle body 1. A right inner edge of the left floor panel 21L in the width direction of the vehicle body 1 is joined to the center tunnel panel 22. To the lower side of the joint portion between the left floor panel 21L and the center tunnel panel 22, a left tunnel frame 26L extending in the front and rear direction of the vehicle body 1 under the left floor panel 21L is joined. A left floor frame 27L extending in the front and rear direction of the vehicle body 1 is joined to the lower surface of the left floor panel 21L. The left floor frame 27L is positioned between the left side sill 25L and left tunnel frame 26L. A left center beam 28L is joined to the front end of the left floor frame 27L. A left rear beam 29L is joined to the rear end of the left side sill 25L.

In addition, to the left floor panel 21L, a left front seat cross member 30L extending in the width direction of the vehicle body 1 is joined. The left front seat cross member 30L extends from the left side sill 25L to the center tunnel panel 22. The left front seat cross member 30L has a left front upper seat cross member 31L (see FIG. 7) joined to the upper side of the left floor panel 21L and a left front lower seat cross member 32L joined to the lower side of the left floor panel 21L. The left front upper seat cross member 31L and the left front lower seat cross member 32L are joined to positions over and under the left floor panel 21L that overlap each other.

Further, to the left floor panel 21L, a left rear seat cross member 33L extending in the width direction of the vehicle body 1 is joined. The left rear seat cross member 33L is disposed at the rear of the left front seat cross member 30L. The left rear seat cross member 33L extends from the left side sill 25L to the center tunnel panel 22. The left rear seat cross member 33L has a left rear upper seat cross member 34L (see FIG. 7) joined to the upper side of the left floor panel 21L and a left rear lower seat cross member 35L joined to the lower side of the left floor panel 21L. The left rear upper seat cross member 34L and the left rear lower seat cross member 35L are joined to positions over and under the left floor panel 21L that overlap each other.

To the left front upper seat cross member 31L and the left rear upper seat cross member 34L that are disposed so as to be arranged in the front and rear direction on the left floor panel 21L, a pair of left seat rails 36L extending in the front and rear direction are fixed, as illustrated in FIGS. 7 and 8 described later. The pair of left seat rails 36L are disposed so as to be arranged in the width direction of the vehicle body 1, and support a left seat 37L in which the passenger sits such that the left seat 37L is slidable in the front and rear direction of the vehicle body 1.

Thus, over the left floor panel 21L, a left over-floor framework 38L is formed by the left front upper seat cross member 31L, the left rear upper seat cross member 34L, and the pair of left seat rails 36L. The left over-floor framework 38L is formed under the left seat 37L in which the passenger sits.

In addition, as illustrated in FIG. 2, under the left floor panel 21L, a left under-floor framework 39L is formed by the left front lower seat cross member 32L, the left rear lower seat cross member 35L, the left floor frame 27L, and the left tunnel frame 26L. As illustrated in FIG. 7, the left under-floor framework 39L is positioned below the left over-floor framework 38L. The left under-floor framework 39L and the left over-floor framework 38L firmly stiffen the left floor panel 21L from above and below.

Further, the left floor panel 21L has a left raised portion 40L that protrudes upward inside the left over-floor framework 38L and the left under-floor framework 39L provided at positions that overlap each other. The left raised portion 40L is positioned close to the back of the left seat 37L.

With the left raised portion 40L, a portion that is concave when viewed from the back surface of the floor is formed in the back surface of the left floor panel 21L.

The right center beam 28R and the left center beam 28L extend toward the front from the front edge of the passenger compartment 3 of the vehicle body 1 and are positioned in the front compartment 2. The engine 6 and the axle 5 of the front wheels are mounted on the right center beam 28R and the left center beam 28L.

The right rear beam 29R and the left rear beam 29L extend toward the rear from the rear edge of the passenger compartment 3 of the vehicle body 1 and are positioned under the trunk 4. The rear differential box 9 and the axle 10 of the rear wheels are mounted on the right rear beam 29R and the left rear beam 29L.

Figure 3:
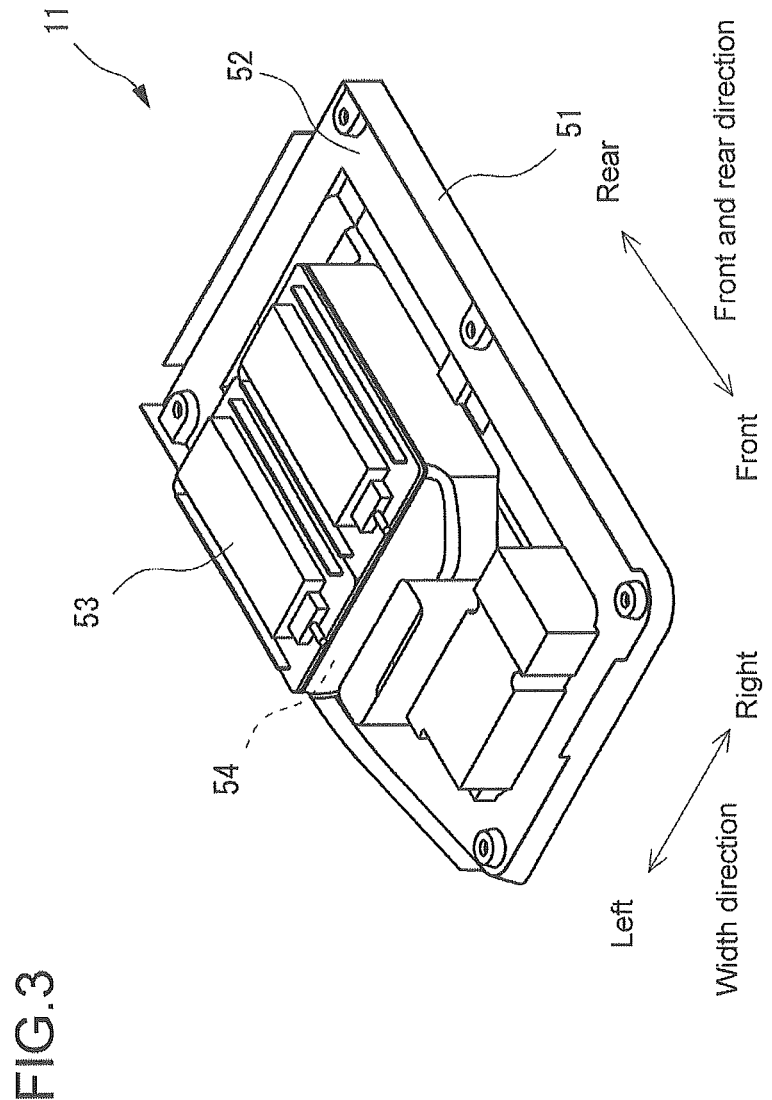
FIG. 3 is a perspective view illustrating a battery module that is detachably attached under a floor of the vehicle body of FIG. 2.

FIG. 3 is a perspective view illustrating the battery module 11 that is detachably attached under the floor of the vehicle body 1 of FIG. 2.

The battery module 11 of FIG. 3 has a battery pan 51, a battery framework 52, a battery cover 53, and the battery pack 54.

Note that the battery module 11 of FIG. 3 is an example of the battery module attached to the back side of the right floor panel 21R. The battery module 11 attached to the back side of the left floor panel 21L is only partially different from the battery module 11 attached to the back side of the right floor panel 21R in appearance and has the structure equal to that of FIG. 3 so that the depiction and description thereof will be omitted.

The battery pan 51 is in a substantially rectangular flat shape. An outer peripheral portion of the battery pan 51 is provided with the battery framework 52 in a substantially quadrilateral frame-like shape over the entire periphery thereof.

The battery cover 53 is substantially in the shape of a bottomless box. The battery cover 53 is fixed to the center of the battery pan 51. The battery pack 54 is disposed in a space closed by the battery cover 53 and the battery pan 51.

Figure 4:
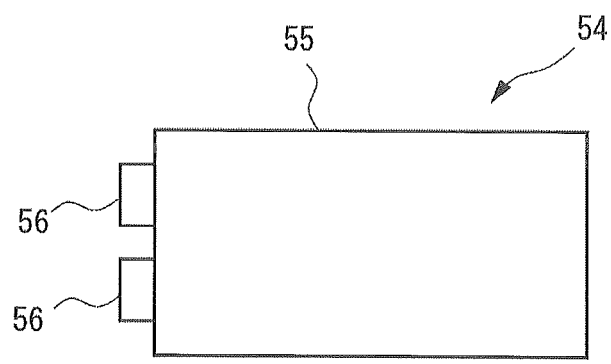
FIG. 4 is a schematic side view of a battery pack used in the battery module of FIG. 3.

FIG. 4 is a schematic side view of the battery pack 54 used in the battery module 11 of FIG. 3.

The battery pack 54 has a pack main body 55 in the shape of a thin plate, and a pair of electrode pieces 56 protrude from one side of the pack main body 55.

The pair of electrode pieces 56 are connected to, e.g., the inverter 12.

A plurality of the battery packs 54 are accommodated side by side in the battery cover 53.

Next, a description will be given of how to attach the battery module 11 of FIG. 3 to the vehicle body 1 of FIG. 2.

Figure 5:
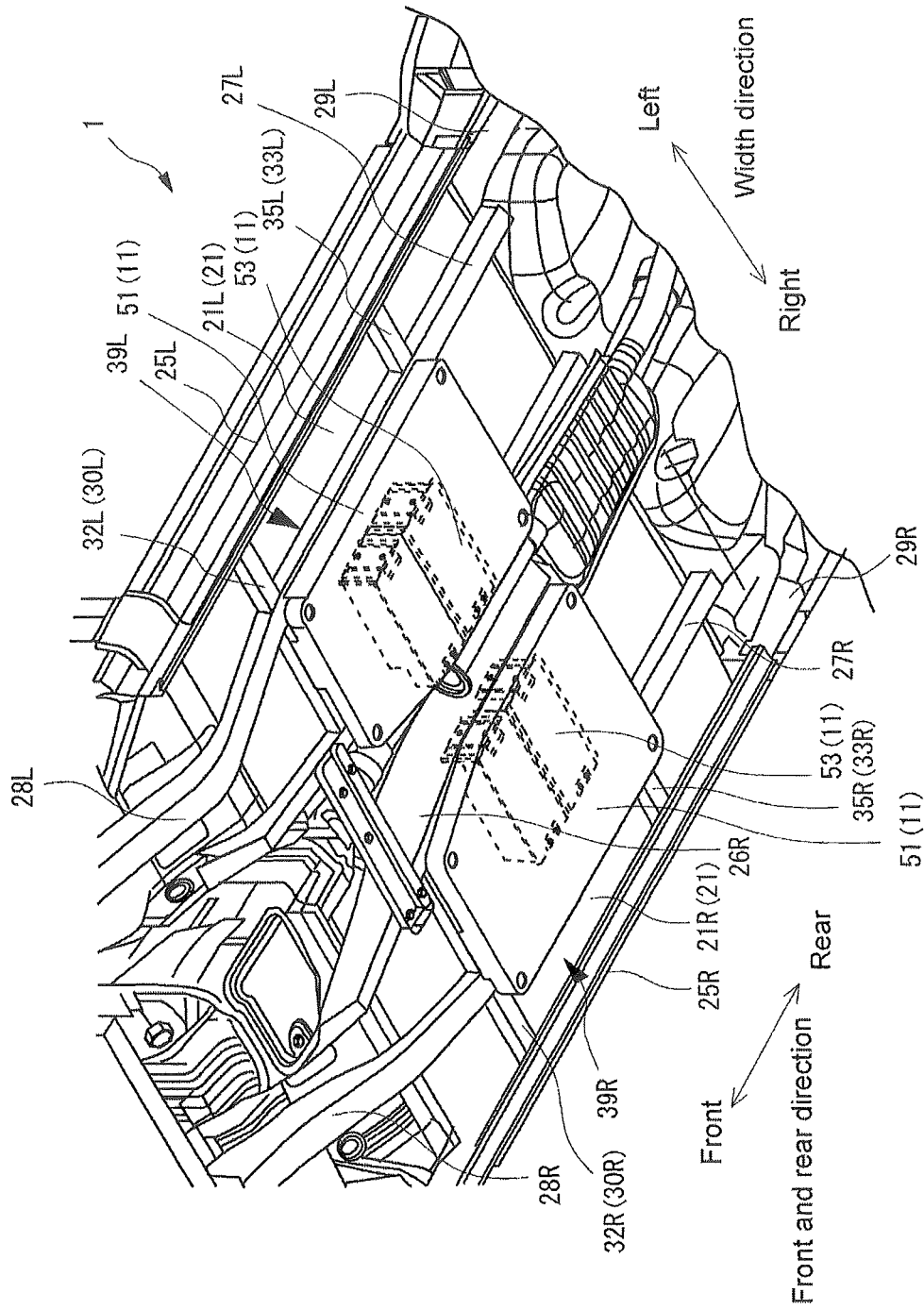
FIG. 5 is a partial perspective view illustrating a state in which the battery module of FIG. 3 is attached to the vehicle body of FIG. 2.

FIG. 5 is a partial perspective view illustrating a state in which the battery module 11 of FIG. 3 is attached to the vehicle body 1 of FIG. 2.

The battery module 11 on the right side is attached to the back side of the right floor panel 21R of FIG. 2 with the battery cover 53 positioned at the top. The battery pan 51 is fixed to the right under-floor framework 39R.

The battery module 11 on the left is attached to the back side of the left floor panel 21L of FIG. 2 with the battery cover 53 positioned at the top. The battery pan 51 is fixed to the left under-floor framework 39L.

By attaching the two battery modules 11 as the battery module on the right side and the left side separately, it is possible to provide a floor tunnel between the two battery modules 11, and allow the drive shaft 8 and the exhaust pipe 24 to pass through the floor tunnel.

Figure 6:
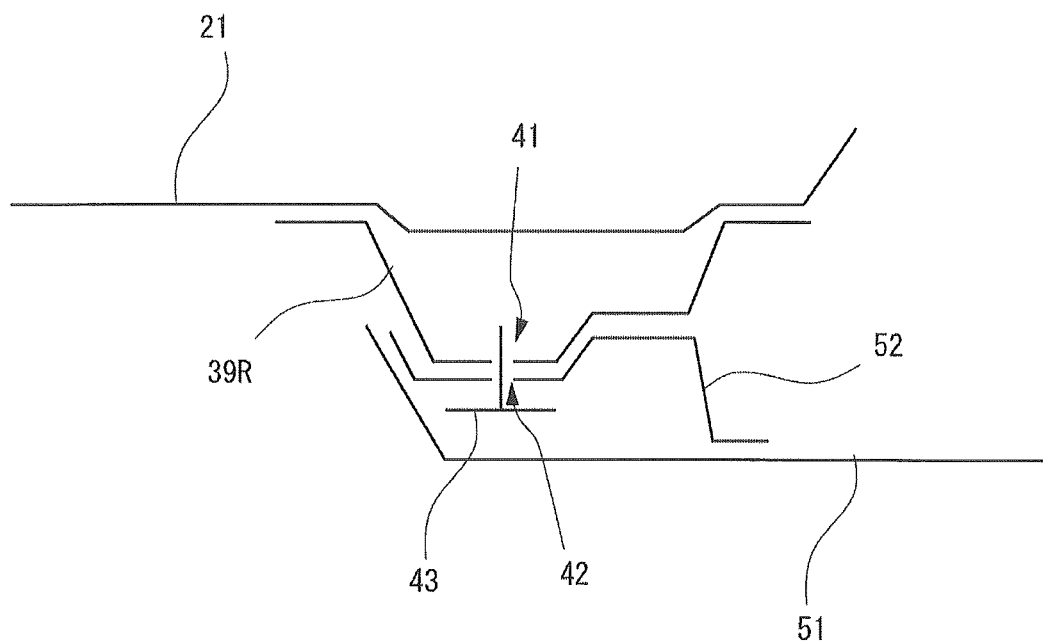
FIG. 6 is a schematic enlarged explanatory view of a coupling portion between the battery module and the vehicle body.

FIG. 6 is a schematic enlarged explanatory view of a coupling portion between the battery module 11 and the vehicle body 1.

FIG. 6 illustrates a partial cross section of the floor panel 21 and the right under-floor framework 39R of the vehicle body 1, and the battery framework 52 and the battery pan 51 of the battery module 11.

Note that the right under-floor framework 39R of FIG. 6 may be the right front lower seat cross member 32R, the right rear lower seat cross member 35R, the right floor frame 27R, or the right tunnel frame 26R.

The joint surface of the lower side of the right under-floor framework 39R is formed into an outwardly convex stepped shape, and the joint surface of the upper side of the battery framework 52 is formed into an inwardly convex stepped shape. By joining the stepped portions to each other, the battery framework 52 can be properly positioned with respect to the right under-floor framework 39R. In addition, a through hole 41 formed in the right under-floor framework 39R is positioned in line with a through hole 42 formed in the battery framework 52 and, e.g., a screw 43 can be inserted into these through holes 41 and 42 as a fastener. With this, the battery framework 52 of the battery module 11 can be fixed to the right under-floor framework 39R of the vehicle body 1 so as to be detachable downward.

Note that the coupling portion between the left under-floor framework 39L and the battery module 11 also has the same attachment structure.

FIG. 7 is a schematic explanatory view of a state in which the battery module 11 is attached under the right seat 37R when viewed from the right. Note that a state in which the battery module 11 is attached under the left seat 37L is also the same as that of FIG. 7.

FIG. 8 is a schematic explanatory view of a state in which the two battery modules 11 are attached under the right seat 37R and the left seat 37L when viewed from the front.

As illustrated in FIGS. 7 and 8, the battery framework 52 of the battery module 11 is fixed to the right under-floor framework 39R under the right seat 37R. In this state, the battery cover 53 placed at the center of the battery pan 51 of the battery module 11 is disposed in the concave portion of the floor panel 21 formed by the right raised portion 40R. With this, it is possible to secure the height of the battery cover 53 and longitudinally dispose a plurality of the battery packs 54 densely in the battery cover 53. With the right raised portion 40R, it is possible to secure the space for mounting the battery pack 54 and the inverter 12.

The battery framework 52, the right under-floor framework 39R, and the right over-floor framework 38R are stacked around the plurality of the battery packs 54. With this, it is possible to surround the plurality of the battery packs 54 using the multilayer frameworks 38R, 39R, and 52 that are stacked on each other.

Note that the left under-floor framework 39L and the battery module 11 also have the same attachment structure.

In addition, as illustrated in FIGS. 7 and 8, the joint surface of each of the battery framework 52 and the right under-floor framework 39R has the stepped portion that extends along the entire periphery of the framework. With this stepped portion, it is possible to facilitate positioning when the battery module 11 is fixed to the vehicle body 1. In addition, it is possible to allow the joint surfaces of the battery framework 52 and the right under-floor framework 39R to have a seal structure.

Note that each of the left under-floor framework 39L and the battery module 11 also has the same stepped structure.

Further, as illustrated in FIG. 7, the right front seat cross member 30R and the right rear seat cross member 33R are joined to inclined surfaces in the front and the rear of the right raised portion 40R. With this, it is possible to increase the width in the front and rear direction of the concave portion formed in the back surface of the right floor panel 21R by the right raised portion 40R as compared with the case where the right raised portion 40R is formed between the right front seat cross member 30R and the right rear seat cross member 33R. As a result, it is possible to increase the mounting capacity of the battery pack 54.

Each of the right front seat cross member 30R and the right rear seat cross member 33R is disposed so as to be divided into portions over and under the right floor panel 21R. Therefore, by providing the right front upper seat cross member 31R and the right rear upper seat cross member 34R on the upper side on the inclined surfaces of the right raised portion 40R, the cross section of each cross member becomes triangular and is reduced, but it is possible to compensate the insufficiency in the cross section using the triangular cross sections of the right front lower seat cross member 32R and the right rear lower seat cross member 35R on the lower side. Accordingly, it is possible to secure the large cross section as the cross-sectional area of the right front seat cross member 30R or the right rear seat cross member 33R.

Note that the left front seat cross member 30L on the left side or the left rear seat cross member 33L thereon has the same structure.

Thus, since the battery pack 54 is disposed under each of the right seat 37R and the left seat 37L in the present implementation, it is possible to mount a large number of the battery packs 54 in the vehicle body 1 without reducing the practical space of the vehicle body 1 to thereby impair comfort as in the case where the battery pack 54 is disposed in the passenger compartment 3 or the trunk 4 of the vehicle body 1. Unlike the case where the battery pack 54 is disposed in the trunk 4 or under the floor panel 21 of the vehicle body 1, the practical space is not reduced.

On the right side, the battery pack 54 is held at the position apart from the outer periphery of the vehicle body 1 inside the right over-floor framework 38R formed by the pair of right seat rails 36R, the right front upper seat cross member 31R, and the right rear upper seat cross member 34R.

Similarly on the left side, the battery pack 54 is held at the position apart from the outer periphery of the vehicle body 1 inside the left over-floor framework 38L formed by the pair of left seat rails 36L, the left front upper seat cross member 31L, and the left rear upper seat cross member 34L.

Thus, since the battery pack 54 is disposed under each of the right seat 37R and the left seat 37L of which the structure is particularly devised such that deformation does not occur in the vehicle body 1, it is possible to secure high collision safety for the battery pack 54 against collisions from all sides. Even when the outer peripheral portion of the floor panel 21 is deformed due to the collisions from all sides, the battery pack 54 is less likely to be affected by the deformation.

The battery pack 54 is held not over the floor panel 21 but under the floor panel 21R. Accordingly, it is possible to isolate the battery pack 54 from the passenger compartment 3 of the vehicle body 1 and the like, and hence it is possible to suppress deterioration of the environment of the passenger compartment 3 or the like caused by the failed battery pack 54. In addition, it is possible to lower the center of gravity of the vehicle body 1.

In the present implementation, the right raised portion 40R that protrudes upward is formed in the right floor panel 21R, and the battery pack 54 is disposed in the right raised portion 40R. Similarly, the left raised portion 40L that protrudes upward is formed in the left floor panel 21L, and the battery pack 54 is disposed in the left raised portion 40L.

Therefore, it is possible to secure the height of the space for mounting the battery pack 54 and increase the mounting capacity of the battery pack 54. That is, it is possible to increase the number of the battery packs 54 that can be mounted while suppressing a reduction in practical space.

In addition, the right raised portion 40R is surrounded by the right over-floor framework 38R. It is possible to improve stiffness under the right seat 37R with the spatial structure of the right floor panel 21R and the right over-floor framework 38R. Similarly, the left raised portion 40L is surrounded by the left over-floor framework 38L. It is possible to improve stiffness under the left seat 37L with the spatial structure of the left floor panel 21L and the left over-floor framework 38L.

Therefore, it is possible to improve not only the collision safety for the battery pack 54 but also the collision safety for the passenger who sits in the right seat 37R or the left seat 37L.

In addition, in the present implementation, the right front lower seat cross member 32R and the right rear lower seat cross member 35R are additionally provided under the right floor panel 21R. Therefore, even when the cross-sectional area of the right front upper seat cross member 31R and the cross-sectional area of the right rear upper seat cross member 34R are reduced due to the formation of the right raised portion 40R in the right floor panel 21R, it is possible to secure the cross-sectional area of the entire right front seat cross member 30R or the entire right rear seat cross member 33R. Further, since the right floor panel 21R is sandwiched from above and below, it is possible to secure and enhance the stiffening effect by the right front seat cross member 30R or the right rear seat cross member 33R. The same applies to the left side.

The battery pan 51 is fixed to the right front lower seat cross member 32R and the right rear lower seat cross member 35R that are joined to the lower side of the right floor panel 21R. It is possible to move the right floor panel 21R and the battery pan 51 away from each other by a distance corresponding to the height of each of the right front lower seat cross member 32R and the right rear lower seat cross member 35R. Correspondingly, it is possible to increase the mounting capacity of the battery pack 54. The same applies to the left side.

Further, in the present implementation, the right under-floor framework 39R having high stiffness is formed by the right front lower seat cross member 32R, the right rear lower seat cross member 35R, the right tunnel frame 26R, and the right floor frame 27R under the right floor panel 21R. Since the battery pan 51 of the battery module 11 is fixed to the right under-floor framework 39R having high stiffness, it is possible to secure high collision safety with which deformation is less likely to occur not only for the battery pack 54 disposed under the right floor panel 21R but also for the battery pan 51. In addition, it is possible to firmly attach the battery pan 51 to the vehicle body 1 without using a separate attachment bracket for attaching the battery module 11 to the vehicle body 1 or the like. Accordingly, it is possible to suppress the deformation of the battery pan 51 at the time of the collision and further increase the collision safety for the battery pack 54 held on the battery pan 51. The same applies to the left side.

Furthermore, in the present implementation, the battery framework 52 is provided in the battery pan 51, and the battery pan 51 is attached to the right under-floor framework 39R using the battery framework 52. The battery pack 54 is surrounded and protected by the right over-floor framework 38R, the right under-floor framework 39R, and the battery framework 52. With the large cross section of a plurality of the frameworks 38R, 39R, and 52 that are stacked on each other, the battery pack 54 can be protected at a high level. In addition, the battery pan 51 can be firmly attached. The same applies to the left side.

Moreover, the joint surface of each of the right under-floor framework 39R and the battery framework 52 has the stepped portion that extends along the entire periphery of the framework. The stepped portions function as the waterproof or dustproof seal structure at the joint surfaces of the right under-floor framework 39R and the battery framework 52. In addition, the stepped portions function as an attachment guide when the battery framework 52 is attached to the right under-floor framework 39R, and positioning is thereby facilitated. Further, a cover may not be provided in the battery module 11. Accordingly, it is possible to reduce the weight of the battery module 11. The same applies to the left side.

Since the battery pack 54 is protected by the strong right frameworks 38R, 39R, and 52 that are stacked on each other in the manner described above, it is possible to achieve the structure capable of protecting the battery pack 54 from the collision or the like without providing a frame in the battery pack 54 or using the attachment bracket for each the battery pack 54.

The above-described implementation is an example of the preferred implementation of the present invention, and the present invention is not limited to the implementation. Various modifications or changes can be made without departing from the gist of the invention.

The invention claimed is:

1. A mounting structure of a battery pack of a vehicle body, the mounting structure comprising:
    a floor panel of the vehicle body;
    a pair of seat rails that support a seat in which a passenger sits such that the seat is slidable in a front and rear direction of the vehicle body;
    a front upper seat cross member that is joined to an upper side of the floor panel so as to extend in a width direction of the vehicle body, and fixes the pair of seat rails to the upper side of the floor panel;
    a rear upper seat cross member that is joined to the upper side of the floor panel at a position at a rear of the front upper seat cross member so as to extend in the width direction of the vehicle body, and fixes the pair of seat rails to the upper side of the floor panel;
    a pair of under-floor frames that are joined to a lower side of the floor panel so as to extend in the front and rear direction of the vehicle body along the pair of seat rails; and
    a battery pan that is attached under the floor panel, and holds the battery pack of the vehicle body between the floor panel and the battery pan,
    wherein the battery pack of the vehicle body held under the floor panel is disposed at a position inside an over-floor framework formed over the floor panel by the pair of seat rails, the front upper seat cross member, and the rear upper seat cross member,
    wherein the battery pan is attached to the under-floor frames, and
    wherein the mounting structure further comprises a rear lower seat cross member that is joined to the lower side of the floor panel at a position below the rear upper seat cross member so as to extend in the width direction of the vehicle body.

2. The mounting structure of a battery pack of a vehicle body according to claim 1, wherein
the floor panel has a raised portion that protrudes upward within the over-floor framework, and
the battery pack of the vehicle body held under the floor panel is disposed in a concave portion formed by the raised portion in a back surface of the floor panel.

3. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel; and
a battery pan that is attached under the floor panel, and holds the battery pack of the vehicle body between the floor panel and the battery pan, wherein
the battery pack of the vehicle body held under the floor panel is disposed at a position inside an over-floor framework formed over the floor panel by the pair of seat rails, the front upper seat cross member, and the rear upper seat cross member,
the mounting structure further comprising:
a front lower seat cross member that is joined to a lower side of the floor panel at a position below the front upper seat cross member so as to extend in the width direction of the vehicle body; and
a rear lower seat cross member that is joined to the lower side of the floor panel at a position below the rear upper seat cross member so as to extend in the width direction of the vehicle body, wherein
the battery pan is attached to the front lower seat cross member and the rear lower seat cross member.

4. The mounting structure of a battery pack of a vehicle body according to claim 3, further comprising:
a pair of under-floor frames that are joined to the lower side of the floor panel so as to extend in the front and rear direction of the vehicle body along the pair of seat rails, wherein
the pair of under-floor frames form an under-floor framework under the floor panel together with the front lower seat cross member and the rear lower seat cross member, and
the battery pan is attached to the under-floor framework.

5. The mounting structure of a battery pack of a vehicle body according to claim 4, wherein
the battery pan has a battery framework that is stacked on the under-floor framework over an entire periphery of the battery framework, and
a joint surface of each of the under-floor framework and the battery framework has a stepped portion that extends along the entire periphery of each of the under-floor framework and the battery framework.

6. The mounting structure of a battery pack of a vehicle body according to claim 3, further comprising:
a pair of under-floor frames that are joined to a lower side of the floor panel so as to extend in the front and rear direction of the vehicle body along the pair of seat rails, wherein
the battery pan is attached to the under-floor frames.

7. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel; and
a battery pan that is attached under the floor panel, and holds the battery pack of the vehicle body between the floor panel and the battery pan, wherein
the battery pack of the vehicle body held under the floor panel is disposed at a position inside an over-floor framework formed over the floor panel by the pair of seat rails, the front upper seat cross member, and the rear upper seat cross member,
wherein the floor panel has a raised portion that protrudes upward within the over-floor framework, and
wherein the battery pack of the vehicle body held under the floor panel is disposed in a concave portion formed by the raised portion in a back surface of the floor panel,
the mounting structure further comprising:
a front lower seat cross member that is joined to a lower side of the floor panel at a position below the front upper seat cross member so as to extend in the width direction of the vehicle body; and
a rear lower seat cross member that is joined to the lower side of the floor panel at a position below the rear upper seat cross member so as to extend in the width direction of the vehicle body, wherein
the battery pan is attached to the front lower seat cross member and the rear lower seat cross member.

8. The mounting structure of a battery pack of a vehicle body according to claim 7, further comprising:
a pair of under-floor frames that are joined to the lower side of the floor panel so as to extend in the front and rear direction of the vehicle body along the pair of seat rails, wherein
the pair of under-floor frames form an under-floor framework under the floor panel together with the front lower seat cross member and the rear lower seat cross member, and
the battery pan is attached to the under-floor framework.

9. The mounting structure of a battery pack of a vehicle body according to claim 8, wherein
the battery pan has a battery framework that is stacked on the under-floor framework over an entire periphery of the battery framework, and
a joint surface of each of the under-floor framework and the battery framework has a stepped portion that extends along the entire periphery of each of the under-floor framework and the battery framework.

10. The mounting structure of a battery pack of a vehicle body according to claim 7, further comprising:

a pair of under-floor frames that are joined to a lower side of the floor panel so as to extend in the front and rear direction of the vehicle body along the pair of seat rails, wherein
the battery pan is attached to the under-floor frames.

11. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel;
a pair of under-floor frames that are joined to a lower side of the floor panel so as to extend in the front and rear direction of the vehicle body along the pair of seat rails; and
a battery pan that is attached under the floor panel, and holds the battery pack of the vehicle body between the floor panel and the battery pan,
wherein the battery pack of the vehicle body held under the floor panel is disposed at a position inside an over-floor framework formed over the floor panel by the pair of seat rails, the front upper seat cross member, and the rear upper seat cross member,
wherein the battery pan is attached to the under-floor frames,
the mounting structure further comprising a center tunnel panel extending in the front and rear direction of the vehicle body,
wherein the front upper seat cross member includes:
a left portion fixed to a right side of the center tunnel panel; and
a right portion fixed to a left side of the center tunnel panel, and
wherein the rear upper seat cross member includes:
a left portion fixed to a right side of the center tunnel panel; and
a right portion fixed to a left side of the center tunnel panel.

12. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel;
a pair of under-floor frames that are joined to a lower side of the floor panel so as to extend in the front and rear direction of the vehicle body along the pair of seat rails; and
a battery pan that is attached under the floor panel, and holds the battery pack of the vehicle body between the floor panel and the battery pan,
wherein the battery pack of the vehicle body held under the floor panel is disposed at a position inside an over-floor framework formed over the floor panel by the pair of seat rails, the front upper seat cross member, and the rear upper seat cross member,
wherein the battery pan is attached to the under-floor frames,
wherein the battery pan has a battery framework that is stacked on the under-floor frames over an entire periphery of the battery framework, and
wherein a joint surface of each of the under-floor frames and the battery framework has a stepped portion that extends along the entire periphery of each of the under-floor frames and the battery framework.

13. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel;
a pair of under-floor frames that are joined to a lower side of the floor panel so as to extend in the front and rear direction of the vehicle body along the pair of seat rails; and
a battery pan that is attached under the floor panel, and holds the battery pack of the vehicle body between the floor panel and the battery pan,
wherein the battery pack of the vehicle body held under the floor panel is disposed at a position inside an over-floor framework formed over the floor panel by the pair of seat rails, the front upper seat cross member, and the rear upper seat cross member,
wherein the batter an is attached to the under-floor frames,
wherein the battery pan has a battery framework that is stacked on the under-floor frames over an entire periphery of the battery framework, and
wherein the battery framework includes a through-hole in line with a thru-hole of the under-floor frames.

14. A mounting structure of a battery pack of a vehicle body, the mounting structure comprising:
a floor panel of the vehicle body;
a pair of seat rails that support a seat in which a passenger sits such that the seat is slidable in a front and rear direction of the vehicle body;
a front upper seat cross member that is joined to an upper side of the floor panel so as to extend in a width direction of the vehicle body, and fixes the pair of seat rails to the upper side of the floor panel;
a rear upper seat cross member that is joined to the upper side of the floor panel at a position at a rear of the front upper seat cross member so as to extend in the width direction of the vehicle body, and fixes the pair of seat rails to the upper side of the floor panel;

a pair of under-floor frames that are joined to a lower side of the floor panel so as to extend in the front and rear direction of the vehicle body along the pair of seat rails; and a battery pan that is attached under the floor panel, and holds the battery pack of the vehicle body between the floor panel and the battery pan, wherein the battery pack of the vehicle body held under the floor panel is disposed at a position inside an over-floor framework formed over the floor panel by the pair of seat rails, the front upper seat cross member, and the rear upper seat cross member, wherein the battery pan is attached to the under-floor frames, and wherein the mounting structure further comprises a front lower seat cross member that is joined to a lower side of the floor panel at a position below the front upper seat cross member so as to extend in the width direction of the vehicle body.

* * * * *